United States Patent [19]

Lourdeaux et al.

[11] Patent Number: 4,773,820
[45] Date of Patent: Sep. 27, 1988

[54] BUFFER DEVICE FOR THE SPIRAL HOUSINGS OF WATER TURBINES AND LIKE MACHINES

[75] Inventors: Bernard Lourdeaux, Montbonnot Saint Martin; Patrick Huvet, Chambery, both of France

[73] Assignees: Societe Neyrpic, Grenoble; Service Nationale Electricite de France, Chambery Cedex, both of France

[21] Appl. No.: 24,131

[22] Filed: Mar. 10, 1987

[30] Foreign Application Priority Data

Mar. 12, 1986 [FR] France ................ 86 03717

[51] Int. Cl.⁴ .................................................. F01D 3/00
[52] U.S. Cl. .................................... 415/104; 188/297; 188/314; 248/562; 248/638
[58] Field of Search ............... 415/121 R, 119, 219 R, 415/219 A, 219 B, 219 C, 104, 105, 106, 107; 248/562, 638, 631; 188/313, 314, 311, 297

[56] References Cited

U.S. PATENT DOCUMENTS

| | | | |
|---|---|---|---|
| 1,122,051 | 12/1914 | Wohlenberg | 415/106 |
| 3,749,339 | 7/1973 | Avedissian | 248/638 |
| 4,154,206 | 5/1979 | Le Salver et al. | 248/638 |
| 4,456,426 | 6/1984 | Bellati | 415/219 R |
| 4,593,526 | 6/1986 | Pankowiecki | 248/638 |

FOREIGN PATENT DOCUMENTS 1038594  8/1983  U.S.S.R. ............ 415/168

*Primary Examiner*—Abraham Hershkovitz
*Assistant Examiner*—John T. Kwon
*Attorney, Agent, or Firm*—Dowell & Dowell

[57] ABSTRACT

A buffer device for the spiral housings of water turbines wherein the housing includes an extension located along the axis of the inlet conduit into the housing and wherein a hydraulic cylinder and piston assembly is disposed between the extension and a fixed support with a fluid conduit extending between the housing and the cavity of the hydraulic cylinder and piston assembly.

10 Claims, 2 Drawing Sheets

BUFFER DEVICE FOR THE SPIRAL HOUSINGS OF WATER TURBINES AND LIKE MACHINES

BACKGROUND OF THE INVENTION

1. Field of the Invention

The present invention relates to a buffer device for the spiral housing of water turbines and like machines.

2. History of the Related Art

The spiral housings and exhausters of water turbines, turbines, pumps or one- or multi-stage pumps are subjected to an axial thrust due to the action of the pressure on the inlet section of the conduits in such housings. These axial thrusts are known in practice under the term "bottom effect". Effects of thermal origin may also partially appear due to the variation in the water temperature; these effects cause extensions or retractions of the conduit, provoking an additional force on the housings. The seals associated with the housing may be considerably stressed by such forces, which may lead to displacements of the axis of the housings which movement is incompatible with correct operation of the hydroelectric generators.

To solve this problem, various devices are used at the present time:

(1) buffer devices placed in the axis of the inlet conduit and which form distance piece between the housing and a support. These systems allow a displacement of the housing proportional to the rigidity of the support;

(2) sliding joints which avoid transmitting to the machine the effects of thermal origin. With such systems, the bottom effect which is equal to the hydrostatic thrust provokes a moment of pivoting of the housing on its anchorings.

(3) expansion sleeves placed on the conduit and which, thanks to compensations of efforts by application of the pressure of the water of the housing on a surface of appropriate dimensions, efficiently oppose the bottom effect. They further present a sliding joint which enables the efforts to thermal origin to be absorbed.

At first sight, the expansion sleeves are therefore capable of satisfactorily solving the problem of the bottom effects. However, they present several drawbacks:

a. the water serving for counter-pressure in the expansion sleeve is directly that of the conduit, which may lead to fouling at the level of the tappings between the conduit and the seals;

b. dismantling is not possible without emptying the water inlet conduit since no guard member is disposed upstream of the seals;

c. the expansion sleeves are of large dimensions, since, taking into account the thickness of the conduit, in order to cancel the bottom effect proportional to the surface of the conduit, the same pressure of the housing must be applied on an equivalent annular surface.

Thus, if r is the radius of the conduit and R the radius of the expansion sleeve, the surface of this latter, viz. $\tau (R^2 - r^2)$, must be equal to the surface of the conduit, viz. $\tau r^2$, which leads to the following equalities:

$$\pi R^2 - \pi r^2 = \pi r^2$$

or $R^2 = 2r^2$

-continued viz. $R = r\sqrt{2}$.

This demonstrates that the outer radius of the expansion sleeve is 1.414 times larger than that of the conduit. To this must also be added the thickness of the housing and of the frame which are appreciable for high pressures.

(d) Three seals are necessary, as is well known in the art and in particular by the ESCHER WYSS Bulletin, Vol. 38, No. 1 of 1965.

SUMMARY OF THE INVENTION

It is an object of the improvements forming the subject matter of the present invention, to overcome the drawbacks of the solutions known at present and to produce a buffer which responds better than heretofore to the various desiderata of the art.

To that end, the device according to the invention is inserted in a fixed buffer device of the type described hereinabove in the second paragraph, so as to balance the axial thrust by counter-pressure of the water of the housing conveyed by means of a pipe coming therefrom and which is provided with a stop valve and with a filter.

According to the invention, the buffer device is of the type in which the housing comprises an extension located along the axis of the inlet conduit and in which the device is anchored in a support. The buffer is characterized in that the extension of the housing constitutes one of the two elements of a hydraulic cylinder of which the other element is secured with the support. The fluid conducted into the space formed between the two elements is directed from inside the housing.

BRIEF DESCRIPTION OF THE DRAWINGS

The invention will be more readily understood on reading the following description with reference to the accompanying drawings, in which.

DESCRIPTION OF THE PREFERRED EMBODIMENT

Figure 1:
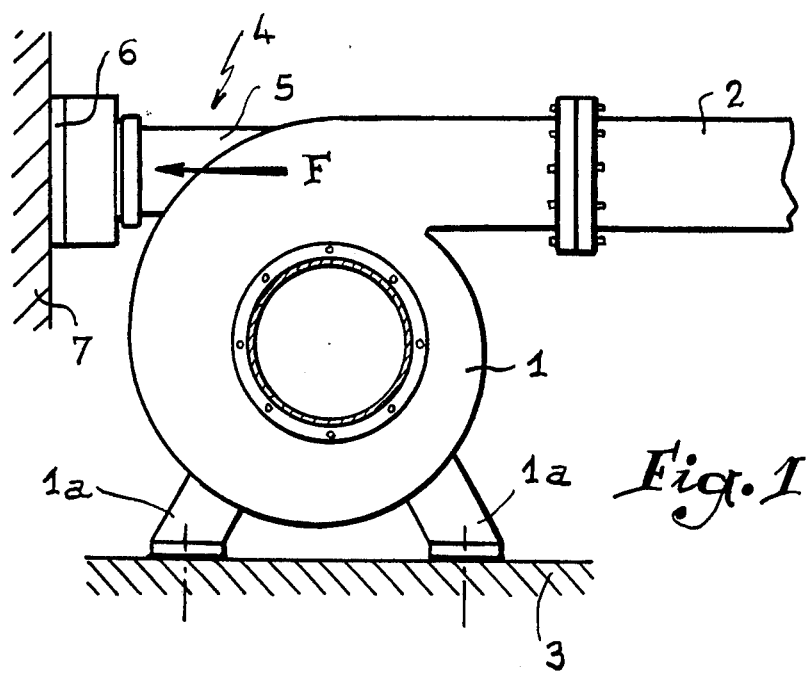
FIG. 1 illustrates the spiral housing of a hydraulic machine with a buffer device located in the geometrical axis of the inlet conduit.

Referring now to the drawings, FIG. 1 illustrates the spiral housing 1 of a hydraulic machine such as a turbine, and which is connected to a conduit 2 conducting water under pressure into the housing 1. The housing is provided with feet 1a which rest on a body of masonry 3. The hydrostatic pressure applied on the bottom of the housing in the direction of arrow F as well as the possible expansion of the conduit 2, possibly absorbed by a supple joint, create forces which act on the anchorings of the feet 1a, possibly causing deformation of the housing 1.

As illustrated in FIG. 1, in order to overcome the effects mentioned, a buffer device 4 has been provided. This device comprises an extension 5 of the housing disposed in the axis of the conduit 2 and in direction opposite thereto so that the extension comes into abutment on a base 6 anchored with respect to a support 7.

Figure 2:
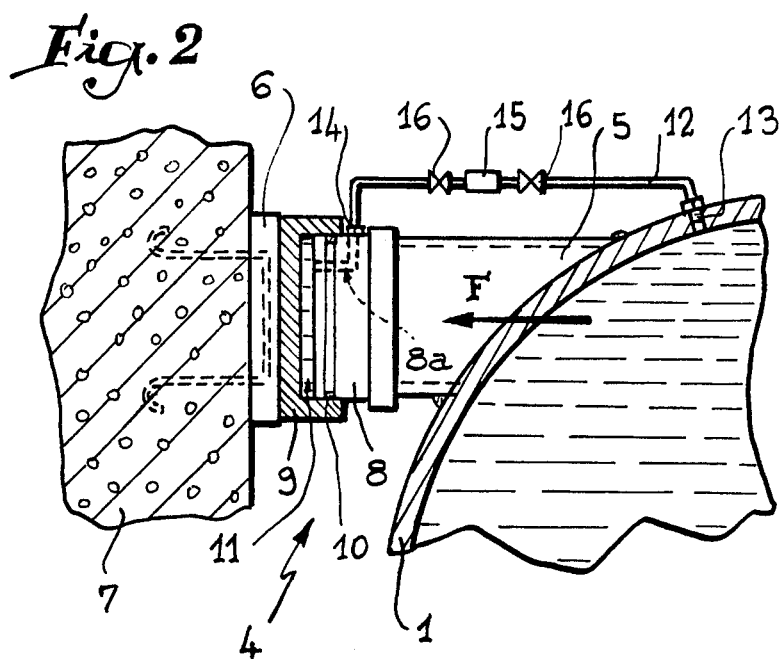
FIG. 2 is a view on a larger scale of a buffer device according to the invention.

According to the invention and as illustrated in FIG. 2, the extension 5 comprises at its end a piston 8 which penetrates in a cylinder 9 associated with the base 6. Of course, a seal 10 ensures tightness between the piston 8 and the cylinder 9. The space or cavity 11 formed between the two elements 8 and 9 which form a hydraulic jack or cylinder, is supplied with water coming from inside the housing 1 via a pipe 12. The pipe 12 is tapped at 13 on the housing and terminates at 14 on piston 8. From this latter point, the piston 8 is hollowed with a channel or conduit 8a communicating the corresponding end of the pipe 12 and the space 11. It will be observed that a filter 15 is inserted in the pipe 12 and a valve 16 is placed on each side of this filter. In this way, when the two valves are open, the pressure prevailing in the housing 1 is transmitted to the space 11 so that the jack constituted by the piston 8 and the cylinder 9 opposes the forces mentioned above. The cross section of the piston 8 is, of course, selected so as to balance such forces. In this way, even if the support 7 is not absolutely rigid, the deformations are compensated by the jack or hydraulic cylinder assembly 8-9.

Because of the filter 15, any fouling of space 11 is avoided, so that the seal 10, which is the only one, has a very long life. Dismantling of the filter 15 with a view to cleaning it may be ensured without having to empty the conduit 2 since, to effect this operation, it suffices to close the valve 16 located between the housing and the filter.

Figure 3:
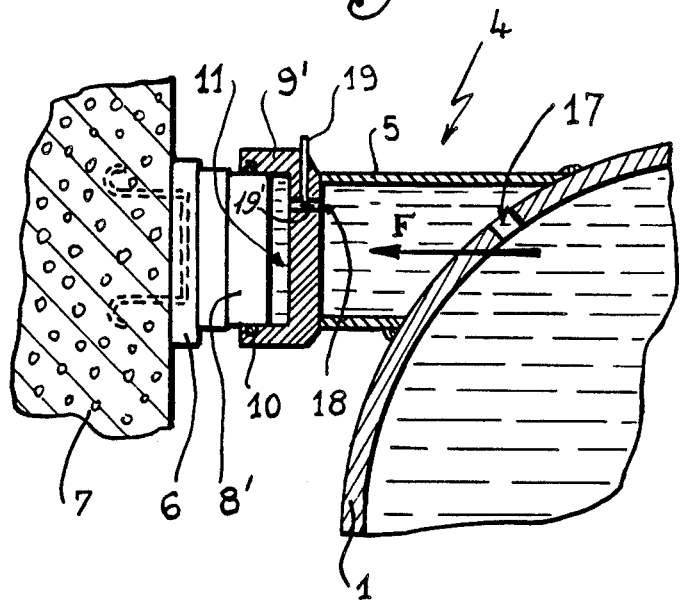
FIG. 3 shows a variant embodiment of the buffer device of FIG. 2

Referring now to FIG. 3, the extension 5 which, moreover, is advantageously provided to be tubular in all cases, communicates with the interior of the housing 1 via an opening 17 made in the housing and with the space 11 via a channel or conduit 18 passing through the thickness of the bottom or end wall of the cylinder 9'.

It is obvious that, in this embodiment, the drawback of other balancing systems is encountered, namely the possible fouling of the seal ensuring tightness between the piston 8' and the cylinder 9', although a filter 19' and an insulating needle 19 may be inserted in the perforation 18.

It must, moreover, be understood that the foregoing description has been given only by way of example and that it in no way limits the domain of the invention which would not be exceeded by replacing the details of execution described by any other equivalents.

Figure 4:
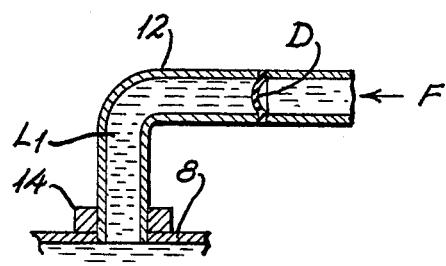
FIG. 4 is an another embodiment of a differential valve.

With a view to reducing the section of the principal hydraulic expansion valve 8-9, a differential valve (not shown) may be inserted between the filter 15 and the stop valve 16. In a variant embodiment, as shown in FIG. 4, this differential jack or hydraulic expansion valve may be replaced by a jack or piston assembly having a diaphragm D mounted along pipe 12 acting on a volume of nonaggressive lubricant liquid L1, enclosed in the space 11 and the corresponding part of the pipe 12.

What is claimed is:

1. A buffer device for the spiral housings of water turbine machines wherein the housings include a fluid inlet, an interior, and an extension which is axially aligned with the fluid inlet and extending outwardly towards a fixed support on the opposite side of the housing from the fluid inlet, the improvement comprising, a hydraulic cylinder means mounted in axial alignment with said extension, said hydraulic cylinder means including a first portion secured to the fixed support and a second portion movable with respect thereto, a cavity formed between said first and second portions, a conduit means communicating the interior of the housing with said cavity whereby the pressure within said hydraulic cylinder means is adjusted so as to directly relate to and offset forces created by the fluid flowing into the housing from the fluid inlet.

2. The buffer device of claim 1 in which said second portion of said hydraulic cylinder means includes a cylinder secured to the extension and extending toward the fixed support, said cylinder having an annular side wall and end wall, said first portion of said hydraulic cylinder means being a piston means secured to the fixed support, and said conduit means including a fluid channel through said end wall of said cylinder communicating said cavity between said cylinder and said piston means with the interior of the housing.

3. The buffer device of claim 2 including an insulating needle disposed through said side wall of said cylinder and into said fluid channel, and filter means carried by said insulating needle.

4. The buffer device of claim 1 in which said conduit means includes a pipe means having first and second tap ends, said first tap end communicating with the interior of the housing and said second tap end communicating with said cavity, a filter means mounted within said pipe means and at least one valve means disposed along said pipe means.

5. The buffer device of claim 4 wherein said at least one valve means is mounted intermediate said filter means and said first tap end of said pipe means.

6. The buffer device of claim 5 including a second valve means disposed along said pipe means between said filter means and said second tap end of said pipe means.

7. The buffer device of claim 6 in which said second portion of said hydraulic cylinder means includes an annular cylinder secured to the fixed support, and said first portion includes a piston means mounted to the extension and slideably carried within said annular cylinder.

8. The buffer device of claim 4 including a diaphragm mounted within said pipe means intermediate said first and second tap ends, said diaphragm having first and second side portions, a separate fluid retained within said cavity and communicating with said first side of said diaphragm and said second side of said diaphragm communicating with fluid within the housing.

9. The buffer device of claim 1 in which said second portion of said hydraulic cylinder means includes an annular cylinder secured to the fixed support, and said first portion includes a piston means mounted to the extension and slideably carried within said annular cylinder.

10. The buffer device of claim 1 in which said first portion of said hydraulic cylinder means includes a piston secured to the fixed support and said second portion includes an annular cylinder connected to the extension.

* * * * *